United States Patent [19]
Evich

[11] 3,837,272
[45] Sept. 24, 1974

[54] MEAL DRYING POLLUTION CONTROL APPARATUS

[75] Inventor: Vincent J. Evich, San Pedro, Calif.

[73] Assignee: Star-Kist Foods, Inc., Terminal Island, Calif.

[22] Filed: June 14, 1973

[21] Appl. No.: 369,791

[52] U.S. Cl............................. 9/483, 99/352, 34/2
[51] Int. Cl.............................................. A23l 3/16
[58] Field of Search...... 99/352, 483, 345, 348–349; 34/2; 126/224, 387, 390; 432/120, 130, 133, 176

[56] References Cited
UNITED STATES PATENTS

| | | | |
|---|---|---|---|
| 1,945,296 | 1/1934 | Klayman et al............................ | 34/2 |
| 1,968,910 | 8/1934 | Poole................................. | 99/473 X |
| 2,905,557 | 9/1959 | Degenhardt...................... | 99/473 X |
| 3,263,592 | 8/1966 | Hickey et al...................... | 99/345 X |
| 3,695,165 | 10/1972 | Sienkiewicz et al............. | 99/483 X |
| 3,741,717 | 6/1973 | Triplett............................ | 99/483 X |

Primary Examiner—Harvey C. Hornsby
Assistant Examiner—Arthur O. Henderson
Attorney, Agent, or Firm—Fulwider Patton Rieber Lee & Utecht

[57] ABSTRACT

Meal drying pollution control apparatus including an incinerator formed with a retention chamber having a burner at the inlet thereof and joining on its downstream end with a rotary dryer. Connected with the downstream end of the rotary dryer is a recirculation conduit which bifurcates into a reheat conduit connected with the upstream end of the retention chamber adjacent the burner and a residual heat conduit connecting with the downstream end of such a chimney is connected with the retention chamber downstream of the reheat conduit for exhausting incinerated exhaust to the atmosphere. The burner is controlled to maintain the recirculated gases entering from the reheat conduit above a predetermined temperature for a selected length of time to thereby incinerate substantially all the impurities therein so the incinerated gases may be exhausted to the atmosphere without substantial pollution thereof. A temperature sensor is located at the outlet to the dryer and controls valves disposed in the residual and reheat conduits to balance flow between such conduits to maintain the desired temperature in such dryer to provide for the desired drying temperature for meal run through such dryer.

14 Claims, 3 Drawing Figures

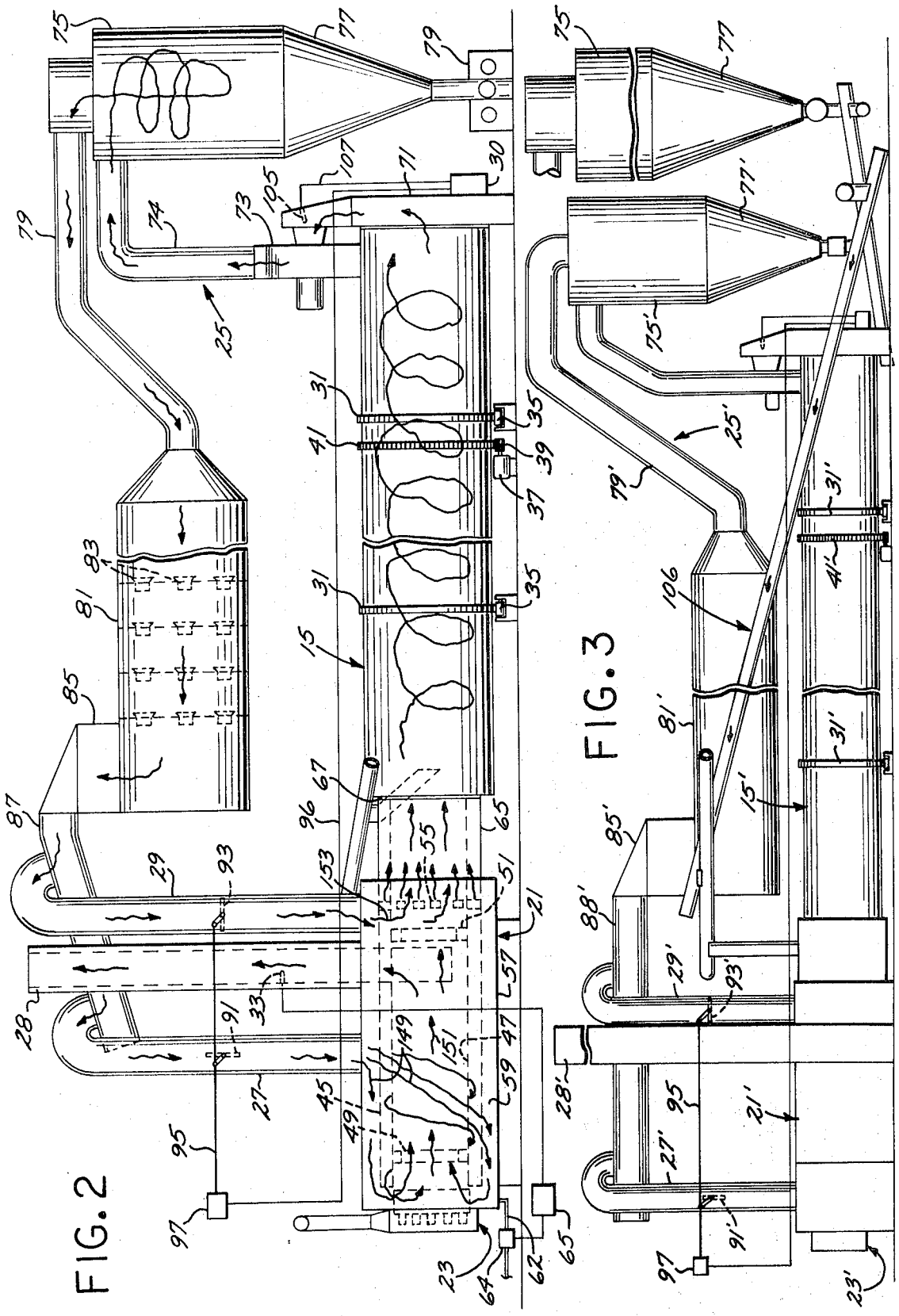

MEAL DRYING POLLUTION CONTROL APPARATUS

BACKGROUND OF THE INVENTION

Field of the Invention

The drying pollution control apparatus of the present invention relates to a dryer for drying granular vegetable matter such as alfalfa or fish meal, or the like, and which includes a burner system for incinerating gases or vapors expelled from such meal prior to release to the atmosphere.

Description of the Prior Art

It has been common practice to process fish meal by cooking such meal and then draining moisture therefrom. The meal is then further run through a press to remove additional moisture therefrom and is then advanced to a dryer for final drying prior to storage. It has been common practice to exhaust the vapors released during the drying stage directly to the atmosphere thus substantially contributing to the already acute air pollution problems. Further, such direct exhaust to the atmosphere necessitated careful control of the dryer temperature to avoid burning of the meal and emission of consequent air polluting smoke. There are no prior art meal drying systems known to applicant which provides for recirculation of the gases from the dryer through balance conduits to maintain a predetermined temperature within such dryer while providing for incineration of exhaust gases by the incinerator.

SUMMARY OF THE INVENTION

The meal drying apparatus of the present invention is characterized by a dryer having a recirculation conduit leading from the outlet end thereof to return gases from such dryer to an incinerator generating the drying heat. The recirculation conduit splits into a reheat conduit and a residual heat conduit with the reheat conduit connecting to the upstream end of the incinerator for incineration of recirculating gases directed through such reheat conduit. A chimney rises from the central portion of the incinerator and the temperature in such incinerator is maintained sufficiently high to assure incineration of any particles in the gas returned through the reheat conduit prior to exhausting out the chimney. Valves are provided in the reheat and residual heat conduits for balancing flow therethrough to provide the necessary flow through the reheat conduit and incinerator to maintain a selected drying temperature in the dryer for proper drying of the meal.

The objects and advantages of the present invention will become apparent from a consideration of the following detailed description when taken in conjunction with the accompanying drawings.

DESCRIPTION OF THE DRAWINGS

FIG. 2 is a vertical longitudinal sectional view taken along the line 2—2 of FIG. 1; and FIG. 3 is a vertical longitudinal sectional view taken along the line 3—3 of FIG. 1.

DESCRIPTION OF THE PREFERRED EMBODIMENT

Figure 1:
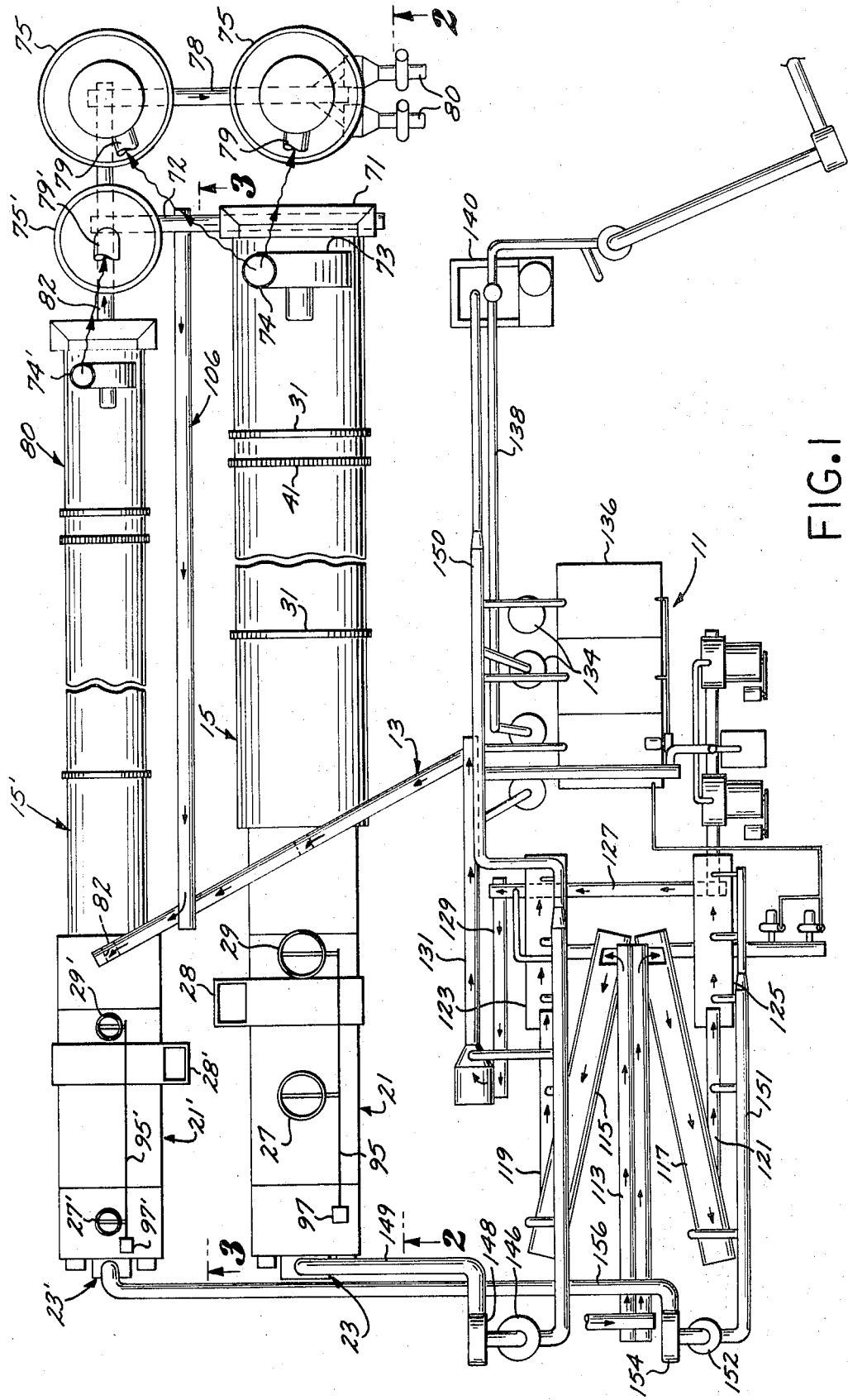
FIG. 1 is a top plan view of a meal drying pollution control apparatus embodying the present invention.

Referring to FIGS. 1 and 2, the meal drying pollution control apparatus of the present invention includes, generally, a cooker and collecting system generally designated 11, which feeds cooked meal through a conveyor 13 leading to the inlet of a first stage rotary dryer 15, the system shown in the preferred embodiment having two dryer stages. Connected with the inlet end of the rotary dryer 15 is an incinerator 21 having a fire box 23 mounted at the upstream end thereof. A recirculation system 25 is connected with the downstream end of the dryer 15 and connects with both a reheat conduit 27 and a residual heat conduit 29. A dryer temperature controller 30 is provided for sensing the temperature at the dryer outlet to balance flow between such reheated and residual heat conduits 27 and 29 to maintain the temperature at the dryer outlet at approximately 220° F. Rising upwardly from the incinerator at a point intermediate the reheat conduit 27 and the residual conduit 29 is an exhaust chimney 31 which has a temperature sensor 33 therein for sensing the temperature of the exhaust gases. A fuel controller 35 is connected with such sensor for controlling fuel to the burner 23 at a rate which will maintain the temperature in the incinerator 21 above approximately 1,200° F. to thus insure incineration of the gases recirculating through the incinerator for a minimum of 0.3 seconds to provide for burning of substantially all the impurities therein prior to exhaust out the chimney 31.

The rotary dryer 15 is in the form of a hollow cylinder having a plurality of peripheral support rings 31 thereon which ride on rollers 35 to support such cylinder for rotation thereof. A drive motor 37 is provided with a drive pinion 39 which meshes with a driven ring gear 41 mounted on such dryer 15 for rotation thereof.

The incinerator 21 includes an inner hollow cylindrical refractory 45 forming an elongated retention chamber 47 having an inlet 49 for receiving heat and flame from the fire box 23. Formed adjacent the outlet from such refractory 45 is an annular pressure drop ring 51 and disposed downstream thereof and directly beneath the residual heat duct 29 is a vortex grid 55 for inducing thorough intermixing of gases flowing therethrough. The refractory 45 is surrounded by an outer shell 57 which cooperates therewith to form an annular counter-flow chamber 59 surrounding such refractory.

The upstream end of the incinerator 21 is covered by the fire box 23 and fuel is supplied to the burners therein by means of fuel lines 62 having fuel control valves 64 therein controlled by the fuel controller 35. A short juncture tube 65 projects from the downstream end of the incinerator 21 and is connected with the upstream end of the rotary dryer 15 by means of a rotary high temperature seal 67.

A discharge box 71 is disposed at the downstream end of the rotary dryer 15 to join with such dryer by means of a rotary seal 73. Projecting under the bottom of the discharge box 71 is a transversely extending collection conveyor 72 for collecting meal for conveyance to a second dryer 15' through a longitudinally extending second stage feed conveyor 76 which dumps into the primary feed conveyor 13. Alternatively, the conveyor 72 may bypass the conveyor 76 and dump directly into an output conveyor 70 leading from the discharge box 71' of the second stage dryer 15'. The upper end of the discharge box 71 is connected with a high volume blower 73 which withdraws gases and fine meal from the discharge box 71 and feeds them to the recirculation system through a conduit 74 leading to a pair of cyclone separators 75. The lower portions of the cyclone separators 75 form respective meal hoppers 77 for collection of such fine meal for conveyance through a conveyor 78 to disintegrators 80. The gases separated from such meal are returned through a return duct 79 to the inlet of a scrubber 81 having a plurality of transverse partitions therein for mounting respective sets of scrubber jets 83. Connected with the outlet of the scrubber 81 is a demister 85 which has gases therefrom fed through an outlet duct 87 to the respective residual heat and reheat ducts 29 and 27.

Mounted in the respective reheat and recirculation residual heat conduits 27 and 29 are respective damper type valves 91 and 93 controlled by means of a linkage 95 connected with a pneumatic actuator 97. The actuator 97 is connected with the recording controller 30 by means of a pneumatic tube 96 mounted on the discharge box 71. The dryer temperature controller 36 is connected with a temperature sensor 105 mounted in the discharge box 71, such connection being by means of a lead 107. The arrangement for the second stage dryer 15' is substantially the same as that described hereinabove with respect to dryer 15 except for the fact that such dryer is of smaller volume and the blower outlet thereof is connected with only one separator 75 and identical primed numerals are employed in identifying the related components.

Referring to FIG. 1, the fish cooker system 11 includes a screw conveyor 113 for feeding unprocessed fish into the inlet of a pair of cookers 115 and 117 disposed on the opposite sides thereof, such cookers leading to respective drain conveyors 119 and 121. The drain conveyors 119 and 121 lead to respective presses 123 and 125 which are, in turn, connected with conveyors 127, 129 and 131 leading to the conveyor 13 connected with the inlet of the first stage dryer 15. Liquid squeezed from the meal by the presses 123 and 125 is pumped to holding tanks 136 to be fed to centrifuges 134 for separation of oils. The oil free liquid is then conducted through a liquid conduit 138 to a covered pumping tank 140, from where it may be selectively removed for further processing.

The cooker 115, drain conveyor 119, press 123, conveyors 127, 129, 133 and 13, holding tank 136 and pumping tank 140 are all covered and connected with a vapor collecting conduit 146 which directs all vapors emitted from the meal being processed through a scrubber 146, fumes blower 148 and primary air conduit 149 to first stage fire box 23 for incineration thereof prior to exhaust to the atmosphere.

The cooker 117, drain conveyor 121 and press 125 are also covered and have their top side connected through a vapor collection conduit 151, scrubber 152, blower 154 and primary air conduit 156 to the fire box 23' for incineration of vapors emitted therefrom.

In operation, the meal drying pollution control apparatus may be utilized to dry fish meal as made from anchovies, or like fish, or even waste fish parts such as tuna heads, viscera and tails. The dryer shown in the preferred embodiment processes 50 tons of fish per hour to produce approximately ten tons of dried meal. It will be apparent that the dryers 15 and 15' may be operated independently of one another, in series or in parallel. For the purpose of this application, the dryers will be described as operating in series.

When the apparatus is utilized in processing fish or fish parts, the fish is normally stored in a pit from which it is selectively extracted by means of the screw conveyor 113 which feeds the fish into the cookers 115 and 117. The fish is cooked as it passes through such cookers and the cooked fish is then passed through drain conveyors 119 and 121 having perforated bottom walls for drainage of liquids. The fish is then advanced to the respective presses 123 and 125 where 50 percent of the moisture is removed by pressing. It should be noted that the condition of the fish frquently drastically alters the amount of moisture that is removed by pressing, thus considerably affecting the performance required by the subsequent drying process to attain the dryness desired in the end product.

Fish from the presses 123 and 125 are advanced through the conveyors 131 and 13 to be introduced to the inlet end of the first stage dryer 15, it being appreciated that all such conveyors are covered, thus directing vapors released from the cooked fish into the fire box 23 of the dryer 15 to incinerate such vapors and provide primary air for the burners included therein.

The first stage rotary dryer 15 is rotated by means of the motor 37 for tumbling of the fish meal. Longitudinal fins projecting radially inwardly from the wall of the dryer 15 enhance tumbling of the fish meal. The blower 73 (FIG. 2) draws air and gases through the dryer 15 and directs them back through the recirculation system 25 to enhance passage of hot air through such tumbling fish meal, thereby accelerating drying thereof.

The finer fish meal is carried with the gases passing from the dryer 15 and through the recirculation blower 73 to be blown into the cyclone separators 75 from where the gases are directed upwardly and through the return conduit 79 to the scrubber 81. The fine fish meal falls downwardly in such cyclone separators 75 for collection in the hoppers 77 and subsequent conveyance through the conveyor 78 to the grinders 80. As best seen in FIG. 2, the recirculating gases passing through the scrubber 81 will pass through the jets 83 to further scrub such gases prior to passage through the demister 85. The gases exiting the demister 85 are then split between the reheat conduit 27 and residual heat conduit 29 in a ratio determined by the setting of the valves 91 and 93 to pass downwardly into the incinerator 21.

The heavier fish meal discharged from the dryer 15 falls downwardly in the discharge box 71 to be fed through the conveyor 72 to the second stage feed conveyor 76 and, finally, into the feed conveyor 13, from where it is dumped through the inlet aperture 82 of a second stage dryer.

It will be appreciated that the temperature of the incinerator is controlled by means of the chimney temperature sensor 33 which is connected with the controller 35 controlling the fuel valves 64 to provide fuel to the burner box 23 at a rate which will maintain the temperature in the chimney 31 at approximately 1,200° F. As the gases are drawn from the incinerator 15 and to the dryer 15, they will drop to approximately 550° F. at the inlet to such dryer and will continue to drop until the outlet thereof is reached. The dryer temperature controller 30 is set to respond to the temperature sensor 105 in the discharge box 71 to maintain the opposed valves 91 and 93 adjusted to maintain the flow rate ratio through the reheat conduit 27 and residual heat conduit 29 balanced for holding the outlet temperature at such sensor at approximately 220° F. Gases flowing down the reheat conduit flow rearwardly around the refractory 45, through the annular counter-flow passage 59, as indicated by directional arrows 149, to turn radially inwardly and reverse in direction to intimately intermix with the flamge from the fire box 23 thereby inducing efficient burning and incineration of particulate matter and gases carried therein while continuing forward flow through the refractory 45 as indicated by the directional arrows 151. On the other hand, the gases directed through the residual heat conduit 29 enter the retention chamber 47 of the incinerator 21 directly at a point downstream of the high temperature refractory to turn and flow generally axially through the gridwork 55 as indicated by the directional arrows 153.

Consequently, it will be apparent that since the temperature in the incinerator 15 is being held at approximately 1,200° F., further opening of the reheat valve 19 and closure of the residual heat valve 93 will result in a greater amount of recycled gases being directed through the counter-flow passage 59 and into the inlet 49 of the refractory 45 for increasing the volume of heated gases introduced into the dryer 15 to thereby increase the temperature of such dryer. If the temperature of the discharge box sensor 105 continues to fall, further opening of the reheat valve 91 and closure of the residual heat valve 93 will continue thereby continuing to heat greater volumes of recycled gases thereby continuing to increase the temperature of the dryer 15 and of the discharge box sensor 105. When the dryer 15 is heated sufficiently to cause the temperature of the sensor 105 to be elevated to approximately 220° F., the controller 30 will respond thereto to commence closure of the reheat valve 91 and opening of the residual heat valve 93 to thereby decrease the volume of gases flowing through such reheat conduit 27 and through the counter-flow annular passage 59 to the inlet 49 of the refractory 45 thereby reducing the volume of gas heated to 1,200° F. and decreasing the rate at which heat is added to the dryer 15. However, the blower 73 will continue to recirculate gases at the same rate thus resulting in a larger portion of such gases being recirculated through the residual heat conduit 29 rather than through the reheat conduit 27. The gases recirculated through the residual heat conduit 29 are introduced directly behind the vortex grid 55 to provide for intermixing with the heated gases flowing the entire length of the refractory 45 to provide for temperature controlled, thoroughly mixed, turbulent flow of hot gases into the dryer 15 for rapid drying of the meal being blown along through such dryer.

Referring to FIGS. 1 and 2, the moisture content of the fish meal discharged from the first stage dryer contains approximately 25 percent moisture and such meal is then passed through the second stage dryer 15' for additional drying thereof, as to approximately 8 percent moisture. It will be appreciated that the drying process in the second stage dryer 15' and recirculation through the recirculation system 25' is the same as set forth hereinabove, with the single exception that only one cyclone separator 75' is employed.

It will be appreciated that the liquid pressed from the fish in the presses 123 and 125 is directed to the covered holding tank 136 and then directed through the centrifuges 134 from where the defatted liquid is directed through a conduit 138 to the covered pumping tank 140. The entire vapor released from the fish in the feed conveyor 113, cooker 115, drain conveyor 119, press 123, conveyors 29, 131 and 13, centrifuges 134, holding tank 136 and pumping tank 140, as well as the vapors from the fish pit, are collected in the vapor collecting conduit 150 to be directed through the scrubber 146, blower 148 and primary air conduit 149 to the fire box of the first stage dryer 15 for incineration of such vapors, it being appreciated that such vapors and gases also supply primary air to the fire box. The vapors from the cooker 117, conveyor 121 and press 125 are directed through the conduit 151, scrubber 152, blower 154 and primary air conduit 156 to the fire box 23' of the second stage dryer 15' for incineration of such gases and vapor and to provide oxygen for burning in such fire box.

From the foregoing, it will be apparent that the combination drying and pollution control apparatus of the present invention provides an economical and convenient means for drying meal while controlling the emission of odors and visible smoke and other polluting gases and particles. The system utilizes the vapors and gases released during the drying process as primary air thus incinerating such vapors and gases to control pollution of the atmosphere. Consequently, the necessity of operating the dryers at relatively low temperatures to avoid burning of the meal and consequent production of polluting smoke, is eliminated thus markedly adding to the versatility of the system over those disclosed in the prior art.

Various modifications and changes may be made with regard to the foregoing detailed description without departing from the spirit of the invention.

I claim:

1. Combination drying and pollution control apparatus for drying granular vegetable matter comprising:

an elongated dryer for receiving granular vegetable matter and formed with a drying chamber having an inlet at one extremity and an outlet at the opposite extremity;

an incinerator adjacent said inlet and formed with an elongated retention chamber leading toward said inlet;

a burner disposed in the end of said incinerator remote from said dryer inlet;

fuel control means for controlling fuel to said burner;

an exhaust chimney leading from the downstream end of said retention chamber;

recirculation conduit means connected with said outlet and formed with a reheat conduit connected with said incinerator adjacent said burner at the upstream end of said retention chamber and a residual heat conduit connected with said incinerator downstream of said reheat conduit;

a blower in said recirculation means for blowing gases through said recirculation means;

reheat and residual heat valve means disposed in said respective reheat and residual conduits for controlling flow therethrough;

a temperature sensor adjacent said outlet for sensing the temperature of vapor expelled from said outlet;

dryer temperature control means connected with said valve means and operative in response to a predetermined temperature sensed by said sensor to move said reheat valve means toward its open position and said residual heat valve means toward its closed position, said control means being further responsive to a selected temperature above said predetermined temperature to shift said reheat valve toward its closed position and said residual valve means toward its open position whereby the recirculation of vapor is balanced between said reheat and residual conduits to maintain the temperature at said sensor between said predetermined and selected temperatures.

2. Combination drying and pollution control apparatus as set forth in claim 1 wherein:
said dryer includes a rotary tube forming said dryer chamber;
rotary sealing means at said inlet and outlet forming a seal between said incinerator and tube and between said tube and recirculation conduit means; and
drive means for rotating said drying tube.

3. Combination drying and pollution control apparatus as set forth in claim 1 that includes:
a chimmey temperature sensor disposed in said chimmey; and
said fuel control means is connected with said chimney temperature sensor and is responsive to a predetermined temperature at the high and low end of a selected chimney temperature range to reduce and increase, respectively, the fuel rate to said burner.

4. Combination drying and pollution control apparatus as set forth in claim 1 that includes:
a separator in said recirculation conduit means for separating the meal from gases flowing through said dryer.

5. Combination drying and pollution control apparatus as set forth in claim 1 that includes:
a scrubber in said recirculation conduit means for scrubbing said vapor.

6. Combination drying and pollution control apparatus as set forth in claim 1 that includes:
a cooker for cooking said matter;
conveying means extending between said cooker and dryer for conveying said cooked matter to said dryer;
shroud means for collecting the vapors from said cooker; and
conduit means connected between said shroud means and dryer for directing collected vapors to said dryer.

7. Combination drying and pollution control apparatus as set forth in claim 1 wherein:
said incinerator includes an open ended inner shell forming said retention chamber and an exterior shell cooperating with said inner shell to form a peripheral counter flow chamber; and
said reheat conduit connects with said outer shell intermediate the length of said interior shell for introducing the recirculating vapor for counter flow in said counter flow chamber to the upstream end of said inner shell.

8. Combination drying and pollution control apparatus for drying granular vegetable matter comprising:
a cooker for cooking meal;
cover means covering said cooker to collect the vapors therefrom;
an elongated dryer formed with a drying chamber having an inlet on one end and an outlet on the opposite end;
conveying means for conveying cooked matter from said cooker to the inlet of said dryer;
an incinerator adjacent said inlet and including burner means for heating gases released from said matter to a selected temperature;
an exhaust chimney leading from the intermediate portion of said incinerator;
a temperature sensor for sensing the temperator of said gases; and
fuel control means connected with said temperature sensor and responsive to predetermined temperatures at the high and low end of a selected temperature range to reduce and increase, respectively, the fuel rate to said burner to maintain the temperature in said chimney within said selected range.

9. Combination drying and pollution control apparatus according to claim 8 wherein:
said dryer includes a rotary tube forming said drying chamber;
rotary sealing means at said inlet and outlet forming a seal between said incinerator and tube and between said tube and recirculation conduit means; and
drive means for rotating said drying tube.

10. Combination drying and pollution control apparatus according to claim 8 that includes:
recirculation conduit means connected between the outlet of said dryer and said incinerator;
a dryer temperature sensor for sensing the temperature of gases from said dryer; and
recirculation control means in said conduit means and connected with said dryer temperature sensor, said control means being responsive to the upper and lower limits of a temperature range sensed by said dryer sensor to decrease and increase, respectively, the rate of recirculation through said conduit means, for controlling recirculation of gases in said recirculation conduit.

11. Combination drying and pollution control apparatus according to claim 1 wherein:
said burner includes open flame means with a primary air inlet disposed adjacent thereto; and
said apparatus includes covered material processing means and fumes collecting conduit means leading from said processing means to said primary air inlet.

12. Combination drying and pollution control apparatus according to claim 1 that includes:
covered fish press means;
covered conveyor means leading from said press means to said dryer; and
fumes collecting conduit means leading from said press means and conveyor means to said burner for incineration of fumes released in said press and conveyor means.

13. Combination drying and pollution control apparatus according to claim 11 that includes:
fumes blower means in said fumes collecting conduit for drawing said fumes through said collecting conduit for introduction to said burner.

14. Combination drying and pollution control apparatus according to claim 13 that includes:
energy control means for controlling energy to said burner and responsive to a change in magnitude in one direction of a control signal to progressively increase the energy to said burner; and
temperature sensing means in said dryer and connected with said energy control means and further responsive to decreases in temperature below a predetermined temperature to produce a change in magnitude in said one direction of said control signal to correspondingly increase the energy to said burner.

* * * * *